(12) United States Patent
Pierce

(10) Patent No.: US 6,832,883 B2
(45) Date of Patent: Dec. 21, 2004

(54) CONVEYOR BIN STAND

(76) Inventor: Kevin J. Pierce, 6473 E. Lake Dr., Grand Forks, ND (US) 58201

( * ) Notice: Subject to any disclaimer, the term of this patent is extended or adjusted under 35 U.S.C. 154(b) by 0 days.

(21) Appl. No.: 09/941,381

(22) Filed: Aug. 28, 2001

(65) Prior Publication Data

US 2003/0053899 A1 Mar. 20, 2003

(51) Int. Cl.$^7$ .................................................. B60P 1/64
(52) U.S. Cl. ....................................................... 414/498
(58) Field of Search ............................... 414/498, 495, 414/458, 469; 296/184, 35.3; 298/22 P; 239/672

(56) References Cited

U.S. PATENT DOCUMENTS

| | | | |
|---|---|---|---|
| 3,096,894 A | * | 7/1963 | Prolev et al. |
| 3,135,407 A | * | 6/1964 | Back |
| 3,180,511 A | * | 4/1965 | Huisman .................... 414/498 |
| 3,255,906 A | * | 6/1966 | Prolev et al. |
| 3,362,552 A | * | 1/1968 | Thiele |
| 3,623,621 A | * | 11/1971 | Tarrant, Sr. ............. 414/498 X |
| 4,253,612 A | * | 3/1981 | Schulze ...................... 239/672 |
| 4,390,286 A | * | 6/1983 | Regaldo ...................... 366/186 |
| 4,750,855 A | * | 6/1988 | Anderson ................... 414/498 |
| 5,829,946 A | * | 11/1998 | McNeilus et al. .......... 414/495 |

* cited by examiner

*Primary Examiner*—Steven A. Bratlie
(74) *Attorney, Agent, or Firm*—Robert E. Kleve

(57) ABSTRACT

The invention comprises a wheeled vehicle having a vehicle frame with rear wheels and a detachable frame mounted to the vehicle frame. The detachable frame is adapted carry a bin, with a conveyor to convey material rearward along the bottom of the bin and spinners at the rear of the bin and at the rear of the conveyor to spin and spread material from the bin onto the conveyor from the conveyor. The wheeled vehicle has a hydraulic piston and cylinder for raising the forward portion of the detachable frame from the vehicle frame and a pair of front and rear legs detachably mounted to the front and rear of the detachable frame to support the detachable frame independently of the vehicle frame, along with the bin, conveyor, and spinners. The rear legs are upwardly adjustable in cooperation with the piston and cylinder to raise the front and rear of the detachable frame to facilitate removal and attachment of the legs to the detachable frame.

6 Claims, 2 Drawing Sheets

CONVEYOR BIN STAND

BACKGROUND OF THE INVENTION

This invention relates to a rear frame support apparatus, more particularly, the invention relates to a stand for independently supporting the load on the rear frame of a vehicle, independently of the vehicle.

It is an object of the invention to provide a novel load support mechanism that can independently support the load of a rear frame of a vehicle, and which can be easily and quickly transferred off the stand onto the vehicle or onto the stand from the vehicle.

Further objects and advantages of the invention will become apparent as the description proceeds and when taken in conjunction with the accompanying drawings wherein:

DESCRIPTION OF PREFERRED EMBODIMENT

Figure 1:
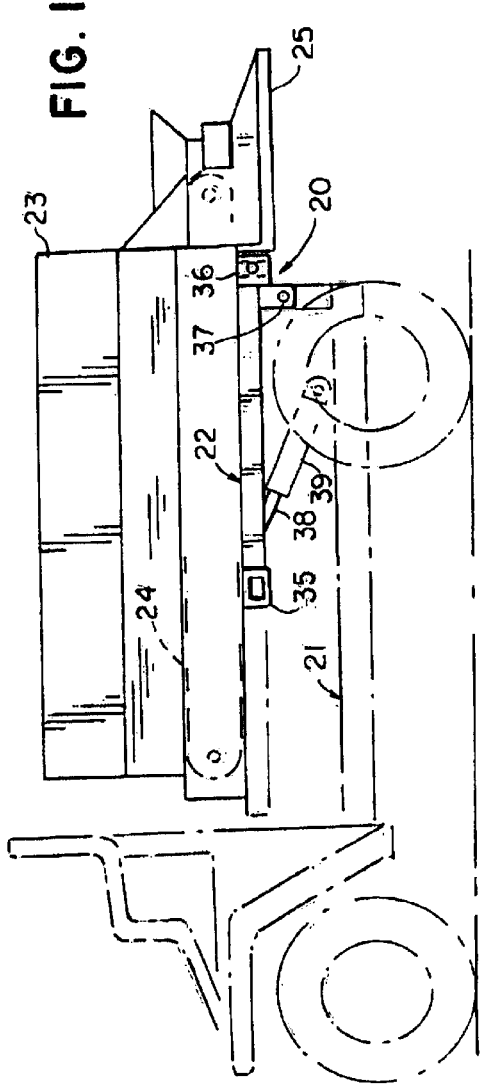
FIG. 1 is a side elevation view of the rear frame stand invention.

Briefly stated, the invention comprises a rear frame stand invention having a separate frame for independently supporting a load mounted on the rear frame of a vehicle, having detachable front and rear legs to detachably mount to the separate frame independently support the separate frame and load thereon, with jacks on the rear legs to engage the ground to raise the separate frame slightly above the main frame to facilitate the removal of the pin connection to the rear of the main frame to the rear of the separate frame, and a piston and cylinder connection between the main frame and the front of the separate frame to raise the front of the separate frame relative to the main frame to facilitate the attachment of the front legs to the separate frame and thereafter lower the separate frame onto the front leg support for the ground to facilitate the detachment of the piston and cylinder connection to the front of the separate frame. The front legs have high bowed out portions to enable the wheels of the main frame to pass beneath and within the confines of the front legs when removing the main frame from the separate frame.

Referring, more particularly to the drawings:

Conveyor bin stand invention 20 is illustrated in FIGS. 1–4, inclusive. The conveyor stand invention 20 for use with a wheeled conveyor apparatus or powered wheeled vehicle having a main frame 21 with a pair of front and rear wheels. The pair of rear wheels 21' are rotatably mounted to the rear of the main frame for rotatably supporting the main frame for travel on the ground. The conveyor bin stand or support invention 20 has a separate frame 22 to which a bin 23 is mounted thereto, a conveyor 24 is mounted beneath the bin, and spinners 25 are rotatably mounted to the rear of the bin beneath the rear end of the conveyor to spin outward material stored in the bin a conveyed rearward by the conveyor to the spinners. The separate frame 22 separately supports the bin, conveyor and spinners.

The separate frame 22 detestably from the main frame 21 to detach thereby also the bin, conveyor and spinners from the main frame. The separate frame 22 has a rectangular frame portion 26 and a pair of detachable front legs 27 and 27' and a pair of detachable rear legs 28 and 28'. The rear legs 28 and 28' have upper and lower portions 29 and 29' and 30 and 30', respectively. The upper portions 29 and 29' are detachable to from the rear of the separate frame 22. Jack members 32 and 32' are mounted to the lower ends of the upper leg portions 29 and 29' and engage ridges along the length of the lower leg portions 29 and 29' in a conventional method to jack the lower leg portions 30 and 30' upward and downward relative to the upper leg portions 29 and 29'.

The conveyor stand invention frame 22 is formed of a pair of longitudinally extending bar members 33 and 33' and laterally extending front and rear bar or frame members 34 and 34' fixed to the longitudinal members to form a rectangular frame. A pair of horizontally extending sleeves 35 and 35' are mounted to outer ends of the forward lateral frame member 34 on each side of the front of the frame and bin. The frame also has a pair of vertical extending sleeves 36 and 36' mounted to the rear of the longitudinal members 33 ad 33' of the frame 22.

Figure 2:
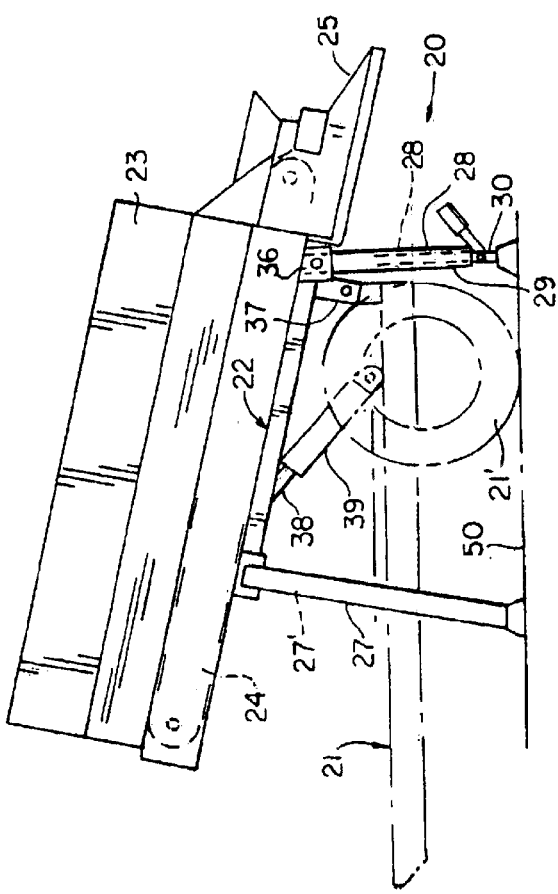
FIG. 2 is a side elevation view of the rear stand invention in its position for independently standing on the ground with the motor vehicle and its rear frame as it is about to be driven forward out from under the stand invention shown in phantom lines
Figure 3:
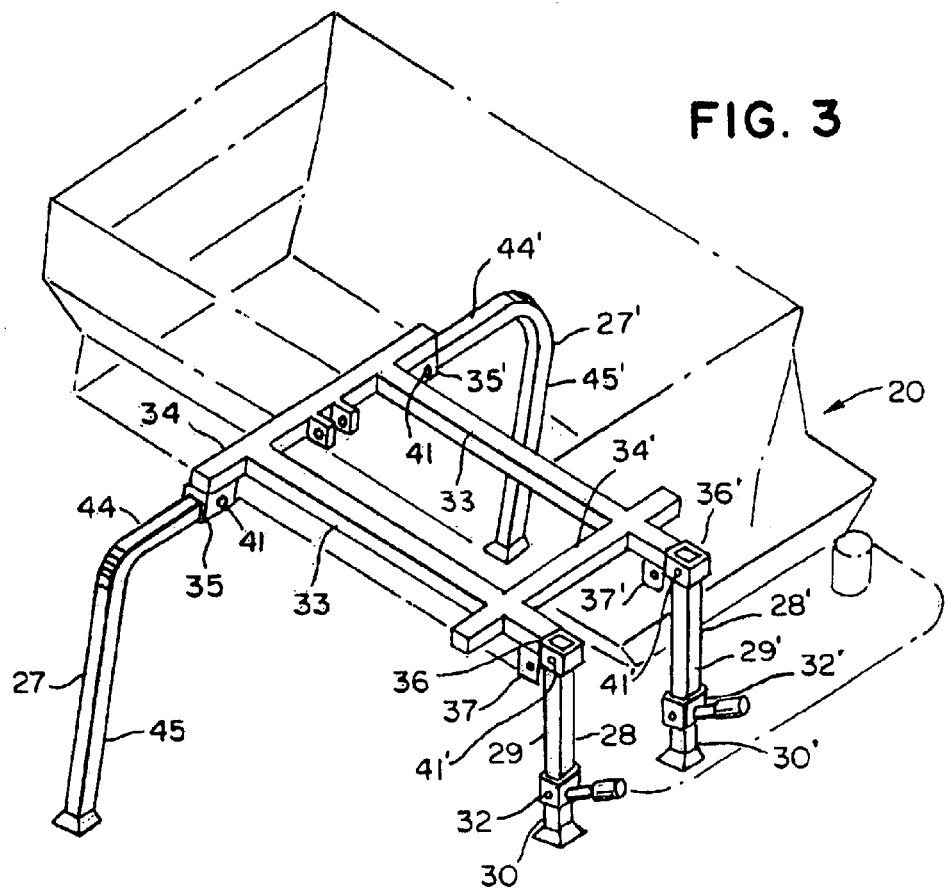
FIG. 3 is a perspective view of the rear frame stand invention.
Figure 4:
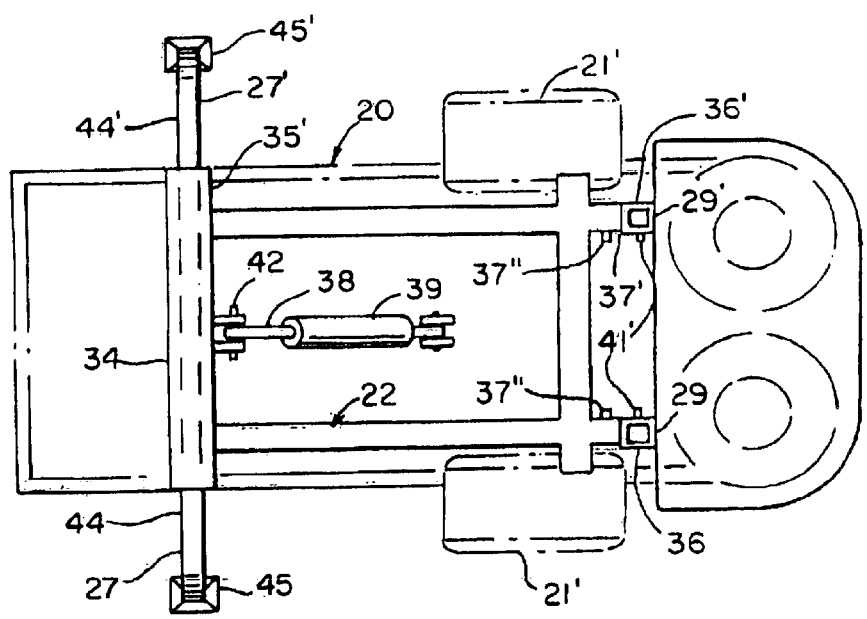
FIG. 4 is a top plan view of the rear frame stand invention

The conveyor apparatus 23, including the frame 22 and the conveyor and spinners may also be detached from the mobile main frame 21 of the apparatus; by pivoting the separate frame 22 upward about its pair of pivotal connections 37 and 37' to the main frame 21 to an upward angle. A hydraulic piston and cylinder 38 and 39 is mounted within the confines of the main frame 21 with the cylinder pivotally mounted to the main frame 21 and the piston pivotally mounted to the separate frame 22, whereby hydraulically actuating the piston relative to the cylinder telescopes the piston out of the cylinder and pivots the separate frame 22 upward about it pivotal connection to the main frame, until the separate frame is at a sufficient angle that the horizontal portions 40 of the front pair of detachable less 27 and 27' may be slid into the horizontal sleeves 35 and 35' and pinned in the sleeves by pines 41, as shown in FIGS. 1 and 2. Thereupon, the upper leg portions 29 and 29' may be pinned to the vertical sleeves 36 and 36' of the frame 22, as shown in FIGS. 1 and 2 by pins 41'.

Whereupon, the jacks 32 and 32' may be jacked to telescope the lower leg portions 30 and 30' downward onto the ground to raise the rear of the frame 22 a short distance off the ground to facilitate the removal of the pins 37" pivotally connecting the rear of the separate frame to the rear of the main frame to detach the rear of the conveyor separate frame 22 from the mobile main frame 21 at the the pivotal connections 37 and 37'. The piston 38 is pivotally connected to the separate frame 22 by pin 42, once the front of the frame has been pivoted upward sufficiently to enable the front legs to be inserted in the sleeves. The piston may retracted sufficiently to lower the front of the frame slightly to enable the pin 42, connecting the piston to the separate frame, to be removed to detach the front of the separate frame from the piston and the main frame. The front and rear legs having been attached to the separate frame and the pin connecting the piston to the front of the separate frame from the main frame and the pins 37" connecting to separate frame to the main frame having been removed; the separate frame can now independently stand on the ground, independently of the main frame 21; and independently of the main frame, support the separate frame, the bin, conveyor and spinners on the ground, for storage.

Once, the separate frame, with the bin, conveyor and spinners thereon is supported on the legs on the ground separate of the main frame; thereupon, the mobile frame 21 may be rolled forward on its wheels 21 and 21' on the ground from the separate frame 22 to remove the mobile frame from beneath the separate frame, conveyor, and spinners of the apparatus.

This enables the conveyor apparatus, including separate frame, the bin, conveyor, and spinners to be stored separately from the mobile main frame so that the mobile main frame may be used for various other purposes, when the conveyor apparatus is not being used. The front legs 27 and 27' each have a bowed out portion 43 with its horizontal portions 44 higher than the wheels 21' and each have vertical portions 45 and 45' outside the wheels to enable the wheels of the mobile frame to roll under the horizontal portions of the legs 27 and 27', when the separate frame is supported on the ground by the front and rear legs the separate frame, when rolling the mobile frame forward from beneath the conveyor separate frame to remove the mobile main frame from the separate conveyor frame.

The telescoping of the hydraulic piston 38 raises the front of the frame 22 slightly above the ground 46 beyond a height necessary for easy insertion or removal of the front legs 27 and 27" into the horizontal sleeves. The operation of the jacks 32 and 32' on the rear legs telescopes the rear lower legs to raise the rear of the frame 22 slightly above the ground 50 to a the height necessary and sufficient to insert or remove the horizontal pins 38" pinning the rear of the separate bin frame 22 to the rear of the vehicle main frame 21 for easier attachment and detachment of the rear of the bin frame to the rear of the vehicle frame.

Thus, it will be seen that a novel structure has been provided for removal and storage of the load of a wheeled vehicle has been provided, which enables the load, including such items as a bin, conveyor and spinner and a separate frame may be independently supported on separate legs and the wheeled vehicle rolled forward on its wheel from beneath the load, whereupon the load may be stood on the ground separately and stored for future use.

It will be obvious that various changes and departures may be made to the invention without departing from the spirit and scope thereof, and accordingly, it is not intended that the invention be limited to that specifically described in the specification, or as illustrated in the drawings, but only as set forth in the appended claims, wherein:

What is claimed is:

1. A bin conveyor stand apparatus for attachment to a wheeled vehicle having a main frame with a front and rear end with wheels mounted to the rear end of the main frame comprising an elongated bin, an elongated conveyor beneath said bin and a separate narrow elongated rectangular horizontal stand frame having forward and rearward ends and positioned beneath and along the length of said conveyor, said horizontal stand frame of said apparatus being adapted to be detachably mounted across and immediately above the main frame of the vehicle, forward mounting sleeve means extending laterally outward from the forward end of said horizontal stand frame beneath said conveyor; rearward mounting means mounted to the rearward end of the stand frame and beneath the conveyor;

a forward and rearward pair of legs;

said forward pair of legs each having an L shape with a horizontal leg portion extending horizontally inward and a vertical leg portion extending vertical downward, said forward mounting sleeve means of said stand frame extending horizontally from said stand frame with said horizontal leg portion of said forward legs extendable into said forward sleeves of the stand frame, with said vertical leg portions extending downward for engagement with the ground for attachment of the forward legs to the stand frame to independently support the forward portion of the stand frame, conveyor, and bin on the ground independently of the vehicle;

said rearward pair of legs forming jack mean having an upper and lower telescoping portions and a jack with the upper portion being adapted to be jacked upward and downward with the jack to telescope the upper portion upward and downward relative to the lower telescoping portion to raise and lower the rearward portion of the stand frame and conveyor and bin with the upper telescoping portion adapted to be mounted to the rearward portion of the stand frame to independently support the rear of the stand frame, conveyor and bin relative to the wheeled vehicle, whereby said stand frame of said apparatus, together with said conveyor and bin, may be detachably removed from said main frame of the wheeled vehicle and supported at the forward and rearward portions on the ground independently of the wheeled vehicle.

2. A bin conveyor stand apparatus according to claim 1 wherein hydraulic means are provided pivotally connected between the main frame of the wheeled vehicle and the stand frame for raising the forward portion of the detachable stand frame upward on the main frame to facilitate the attachment and detachment of the front legs to the stand frame.

3. A bin conveyor stand apparatus according to claim 2 wherein said stand frame has a pivotal mounting adjacent its rearward end, said main frame of said wheeled vehicle has a cooperating pivotal mounting adjacent its rearward end totally connecting the stand frame to the malts frame of the wheeled vehicle, removable pins for the pivotal connection for attachment and detachment of the pivotal connection of the stand frame to the main frame of the vehicle.

4. A bin conveyor stand apparatus for attachment to a wheeled vehicle having a main frame with a front and rear end with wheels mounted to the rear end of the main frame comprising an elongated bin, an elongated conveyor beneath the bin and a separate narrow elongated rectangular horizontal stand frame having forward and rearward ends and opposing sides and positioned beneath and along the length of said conveyor, said horizontal stand frame of said apparatus being adapted to be detachably mounted across and immediately above the main frame of the vehicle; forward leg mounting means on the opposite sides of the forward end of said horizontal stand frame beneath said conveyor, rearward mounting means mounted to the rearward end of said stand frame and beneath the conveyor; a forward and rearward pair of legs; said forward pair of legs each having an L shape with a horizontal leg portion extending horizontally inward and a vertical leg portion extending vertically downward, said horizontal leg portion of said forward legs extendable into detachable engagement with said forward leg mounting means of the stand frame, with said vertical leg portions extending downward for engagement with the ground for attachment of the forward legs to the stand frame to independently support the forward portion of the stand frame, conveyor, and bin on the ground independently of the wheeled vehicle; said rearward paid of legs forming jack means having upper and lower telescoping portions and a jack with the upper portion being adapted to be jacked upward and downward with the jack to telescope the upper portion upward and downward relative to the lower telescoping portion to raise and lower the rearward portion of the stand framed and conveyor and bin with the upper telescoping portion adapted to be mounted to the rear portion of the stand frame to independently support the rear of the frame conveyor and bin relative to the wheeled vehicle, whereby said stand frame of said apparatus, together with said conveyor and bin, may be detachbably removed from said main frame of the wheeled vehicle and support at the forward and rearward portions on the ground independently of the wheeled vehicle.

5. A bin conveyor stand apparatus according to claim 4 wherein hydraulic means are provided pivotally connected between the main frame of the wheeled vehicle and the stand frame for raising the forward portion of the detachable stand frame upward on the main frame to facilitate the attachment and detachment of the front legs to the stand frame.

6. A bin conveyor stand apparatus according to claim 5 wherein said upper telescoping portion of the rear legs are detachably mounted to the stand frame.

* * * * *